(12) United States Patent
Edmon

(10) Patent No.: US 8,630,300 B2
(45) Date of Patent: Jan. 14, 2014

(54) SYSTEM AND METHOD FOR DEPLOYING COMMUNICATION SERVICES

(75) Inventor: Eugene Edmon, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 905 days.

(21) Appl. No.: 11/692,730

(22) Filed: Mar. 28, 2007

(65) Prior Publication Data

US 2008/0240124 A1 Oct. 2, 2008

(51) Int. Cl.
*H04L 12/54* (2013.01)

(52) U.S. Cl.
USPC ............................ 370/401; 370/360; 370/329

(58) Field of Classification Search
USPC ......................................... 370/360, 396, 389
See application file for complete search history.

(56) References Cited

U.S. PATENT DOCUMENTS

| | | | | |
|---|---|---|---|---|
| 5,729,607 A * | 3/1998 | DeFries et al. | ................ | 380/263 |
| 7,532,571 B1 * | 5/2009 | Price et al. | .................... | 370/225 |
| 2004/0005039 A1 * | 1/2004 | White et al. | ............... | 379/93.01 |
| 2004/0085959 A1 * | 5/2004 | Ohkawa | ........................ | 370/389 |
| 2005/0030974 A1 * | 2/2005 | Wright et al. | ................. | 370/468 |
| 2005/0034159 A1 * | 2/2005 | Ophir et al. | ..................... | 725/78 |
| 2005/0235325 A1 * | 10/2005 | O'Donnell | ..................... | 725/72 |
| 2006/0062225 A1 * | 3/2006 | Li | ................................ | 370/396 |
| 2006/0159070 A1 * | 7/2006 | Deng | ............................ | 370/352 |
| 2007/0070890 A1 * | 3/2007 | Rojahn | .......................... | 370/229 |
| 2007/0115899 A1 * | 5/2007 | Ovadia et al. | .................. | 370/338 |
| 2007/0120968 A1 * | 5/2007 | Krisbergh et al. | ......... | 348/14.09 |
| 2007/0121619 A1 * | 5/2007 | Kimbrough et al. | .......... | 370/389 |
| 2007/0232358 A1 * | 10/2007 | Sherman | ....................... | 455/560 |
| 2010/0061244 A1 * | 3/2010 | Meier et al. | .................... | 370/236 |

* cited by examiner

*Primary Examiner* — Robert Wilson
*Assistant Examiner* — Pamit Kaur
(74) *Attorney, Agent, or Firm* — Guntin & Gust, PLC; Jay H. Anderson

(57) ABSTRACT

A system and method for deploying communication services is disclosed. A system that incorporates teachings of the present disclosure may include, for example, a cross-connect system having an Ethernet switch coupled to a central office and coupled to a plurality of buildings by way of a plurality of digital subscriber line (DSL) ports, and a worldwide interoperability for microwave access (WiMAX) transceiver coupled to a high speed port of the Ethernet switch. The WiMAX transceiver can be used to augment a limited capacity of at least one of the plurality of DSL ports by distributing a portion of services carried by the at least one DSL port to the WiMAX transceiver. Accordingly, the cross-connect system can supply dual-mode communications. Additional embodiments are disclosed.

20 Claims, 5 Drawing Sheets

400

SYSTEM AND METHOD FOR DEPLOYING COMMUNICATION SERVICES

FIELD OF THE DISCLOSURE

The present disclosure relates generally to communication systems, and more specifically to a system and method for deploying communication services.

BACKGROUND

As communication networks continue to grow at a rapid pace and continue to add more services, substantial network expansion is taking place to expand the bandwidth capacity supplied to residences and commercial enterprises. Fiber to a premise (typically referred to as FTTP) has been very expensive to deploy and does not find wide usage except in new residential and new commercial buildings. The more affordable approach is to deploy fiber to the curb or node (referred to as FTTC or FTTN). Under this approach, fiber from a central office is directed to a cross-connect box (also known as a service area interface) and terminated at one or more Ethernet switch cards in the cross-connect box that convert optical signals to electrical signals. The electrical signals are in turn supplied to legacy twisted pair wires which run to residences or commercial enterprises as xDSL services.

In other instances, some telecommunication carriers are deploying WiMAX services, which is a broadband wireless network technology based on IEEE's 802.16 standard. WiMAX transceivers are generally installed in remote fields, or commercial buildings much like cellular base station installations. WiMAX can provide roaming and fixed communication devices broadband data services. Deployment of this technology can be expensive due to the cost of installing base stations and cabling to central offices.

It is expected that broadband IPTV and Internet services may require bandwidths greater than what the aforementioned communication technologies can offer on their own. Deployment of these technologies in an uncoordinated manner can be expensive and may not be able to address the growing needs of consumers for more bandwidth.

A need therefore arises for a system and method for deploying communication services.

DETAILED DESCRIPTION

Embodiments in accordance with the present disclosure provide a system and method for deploying communication services.

In a first embodiment of the present disclosure, a cross-connect system (CCS) can have an Ethernet switch coupled to a central office (CO) and coupled to a plurality of buildings by way of a plurality of digital subscriber line (DSL) ports; and a worldwide interoperability for microwave access (WiMAX) transceiver coupled to a high speed port of the Ethernet switch. The WiMAX transceiver can be used to augment a limited capacity of at least one of the plurality of DSL ports by distributing a portion of services carried by the at least one DSL port to the WiMAX transceiver. Accordingly, the cross-connect system can supply dual-mode communications.

In a second embodiment of the present disclosure, a method can involve supplying internet and multimedia services as an aggregated service over one or more corresponding digital subscriber line (DSL) ports having a limited capacity; and augmenting the limited capacity of at least one the DSL ports by distributing a portion of the aggregated service over a wireless access point.

In a third embodiment of the present disclosure, a network management system (NMS) can have a controller element that manages services of a cross-connect system (CCS) that supplies dual-mode digital subscriber line (DSL) services and worldwide interoperability for microwave access (WiMAX) services.

In a fourth embodiment of the present disclosure, a method can involve augmenting bandwidth of an aggregated communication service by combining bandwidth from a digital wireline service and bandwidth from a wireless service.

Figure 1:
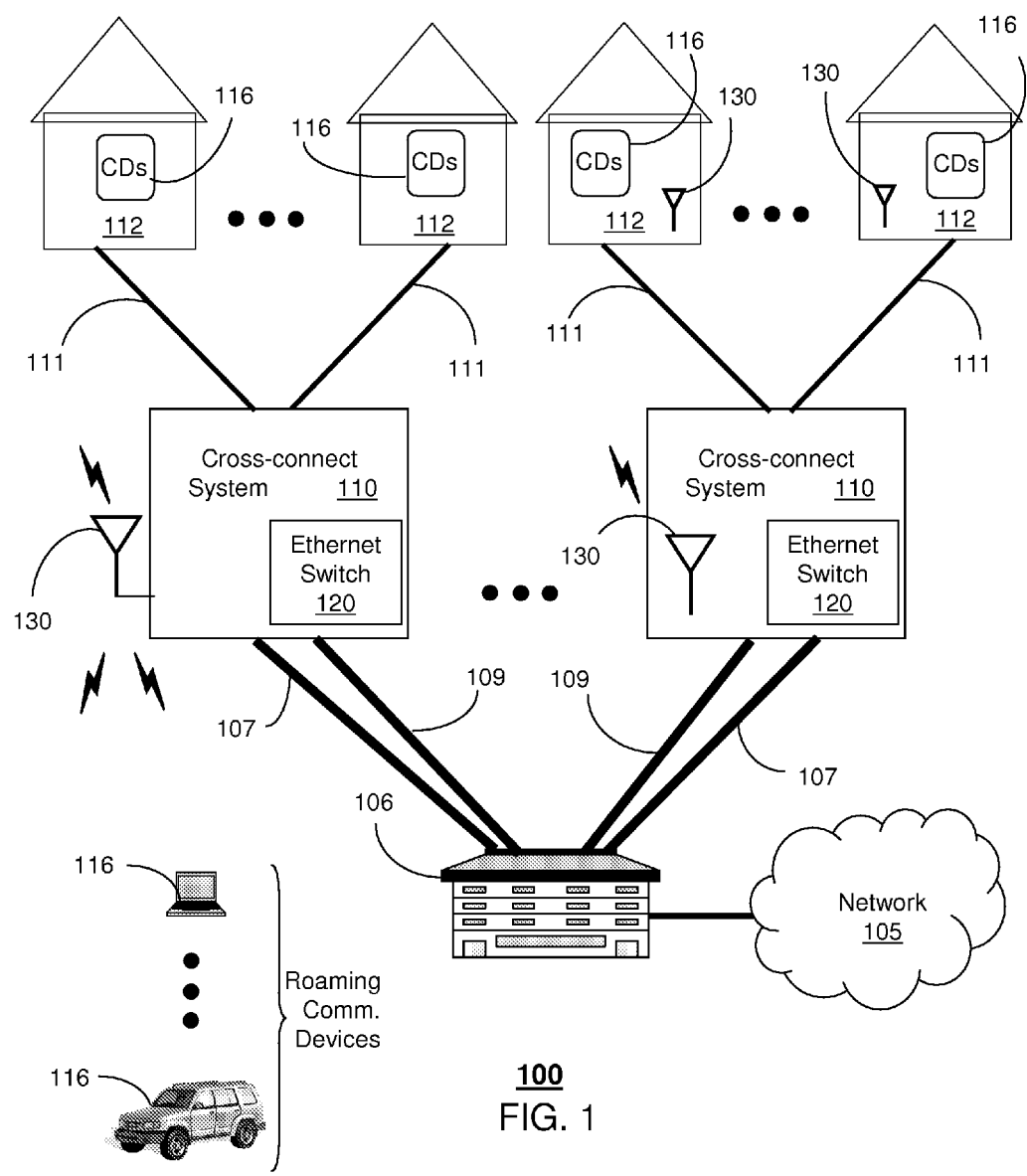
FIGS. 1-3 depict exemplary embodiments of a communication system.

FIG. 1 depicts an exemplary block diagram of a communication system 100. The communication system 100 can comprise a central office (CO) 106 and one or more cross-connect systems (CCSs) 110 that can each be coupled to one or more buildings 112. The CO 106 can house common network switching equipment (e.g., circuit-switched and packet-switched switches and routers) for distributing local and long-distance telecommunication services supplied by network 105 to buildings 112 (such as dwellings or commercial enterprises) by way of the cross-connect systems 110. For illustration purposes only, buildings 112 will be referred to herein as residences 112. However, it should be understood by one of ordinary skill in the art that the buildings 112 can refer to any premises or areas that utilize communication services. Telecommunication services of the CO 106 can include traditional POTS (Plain Old Telephone Service) and broadband services such as HDTV, DSL, VoIP (Voice over Internet Protocol), IPTV (Internet Protocol Television), Internet services, and so on.

Links 107 can be twisted copper pairs for distributing power to the CCSs 110. In one embodiment, links 107 can be coupled to local commercial power near the CCSs 110 supplied by, for example, a utility company. The present disclosure contemplates other structures and techniques for providing power to the CCS 110. The CCS 110 can be coupled to optical and/or electrical cables 109 supplied by the CO 106, which carries any one or more of the aforementioned communications services. These services can be processed in part by active circuits in the CCS 110 and/or circuits at the residences 112. Each cable 109 can carry communication lines numbering in the tens or hundreds. The CCS 110 serves to distribute portions of the cables 109 among the residences 112 as communication links 111. In one embodiment, links 111 can be twisted pair cables. Alternatively, or in combination, links 111 can be coaxial cables much like those used by cable multimedia providers. The CCS 110 serves as a local cross-connect system for unbundling communication lines in cable 109.

In one embodiment, each of the cross-connect systems 110 can have an Ethernet switch 120 with one or more xDSL ports. The CCS 110 can be operably connected to a wireless device 130 by way of a high-speed port of the Ethernet switch 120 for wireless communication with one or more fixed communication devices 116 or portable communication devices roaming outside of building 112 as shown in FIG. 1. xDSL ports in the present context can mean any present or future derivative of a digital subscriber line (e.g., VDSL, ADSL, and so on). The high-speed port of the Ethernet switch 120 can provide for a high bandwidth connection to the Ethernet switch, for example, one Gigabit per second or greater, and can utilize high-speed lines including 1000BASE-X fiber. In one embodiment, the wireless device 130 is a WiMAX transceiver. However, the present disclosure contemplates the use of other wireless devices and techniques, including cellular communication. The present disclosure also contemplates the use of other active devices for implementing the wireline communication between the cross-connect system 110 and the communication device 116.

The positioning of the wireless device or components thereof, such as the WiMAX transceiver 130, can be in the housing of the CCS 110 or can be remotely connected thereto, both of which are shown in FIG. 1. In one embodiment, an antenna of the WiMAX transceiver 130 can be positioned remote from the housing of the CCS 110, while other components of the transceiver, such as the active components, can be positioned in the CCS housing. One or more of the residences 112 can have a complementary wireless device 130, such as a WiMAX transceiver, for engaging in wireless communications with the WiMAX transceiver 130 of the CCS 110. The present disclosure contemplates various configurations of residences 112 with and without wireless devices 130, as well as various configurations of the components of wireless devices 130 housed in and housed outside of CCS 110.

Co-locating at least a portion of the wireless transceiver 130 with the CCS 110 can provide a service provider substantial savings since existing cabling to the CCS can be reused thereby avoiding the need to deploy new cabling to the wireless transceiver. Moreover, operations of the wireless transceiver 130 can be readily managed by the CO 106 through the same fiber link coupled to the Ethernet switch 120. Under this arrangement, the wireless transceiver 130 can supply wireless services to roaming communication devices 116. Alternatively, or in combination the CO 106 can aggregate communication bandwidth from the Ethernet switch 120 and the wireless transceiver 130 to augment bandwidth supplied to one or more buildings 112 for consumption by one or more communication devices 116 operating therein. In yet another arrangement, the CO 106 can be programmed to balance bandwidth utilization by distributing services over xDSL links 111 and by wireless transmissions to buildings 112 having a complementary wireless transceiver 130.

Figure 2:
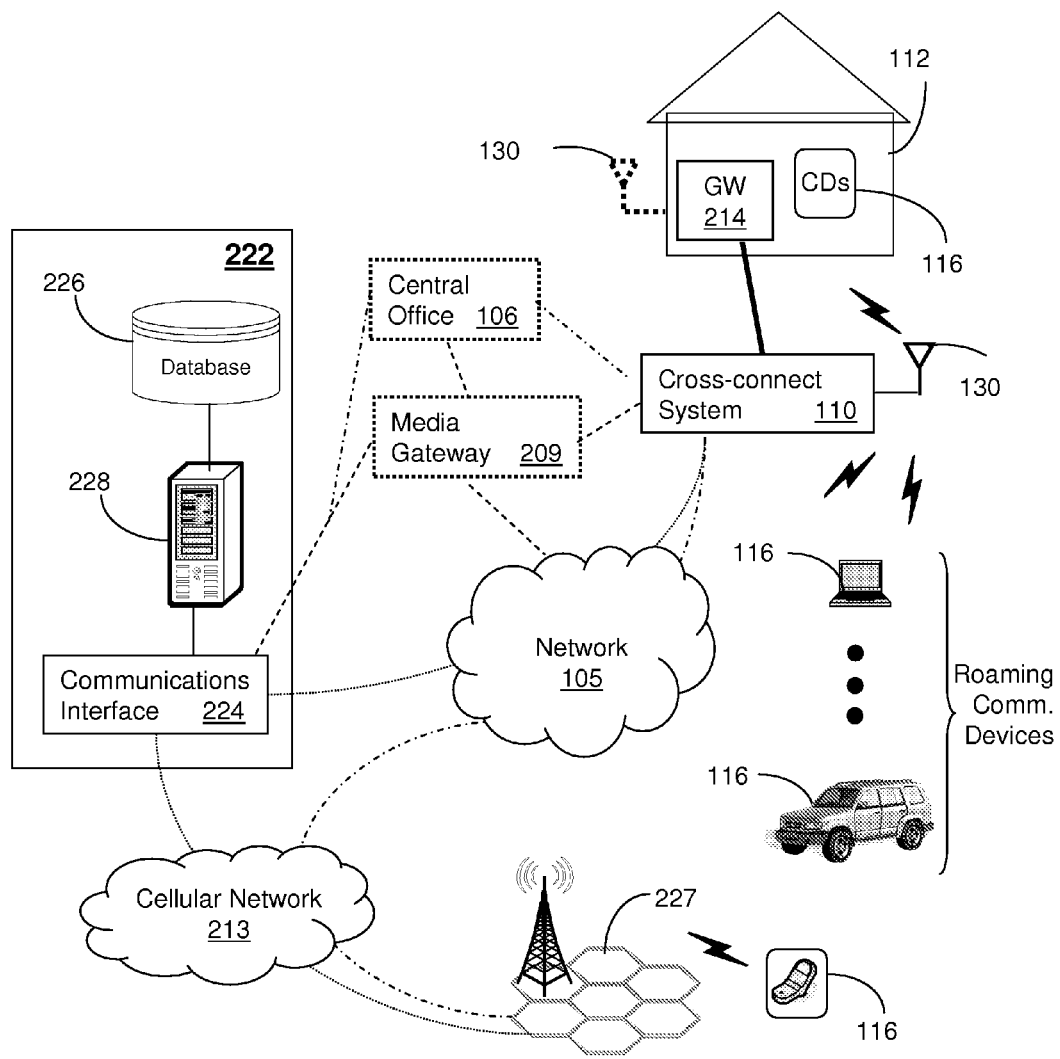

FIG. 2 depicts an exemplary embodiment of a communication system 200 that supplies voice services to one or more fixed and roaming communication devices 116. Communication system 200 can be overlaid or operably represent an embodiment of communication system 100. The communication device 116 can be a portable or fixed VoIP, PSTN, and/or cellular terminal. However, the present disclosure contemplates the use of other types of communication devices, including other types of voice, video and data devices. The communication system 200 can comprise the network 105 referred to in FIG. 1. As a packet-switched network, network 105 can represent an Internet Service Provider (ISP) network. The network 105 can be coupled to a network proxy 222, a cellular network 213 and network elements located in one or more of the buildings 112. As a circuit-switched network, network 105, can provide PSTN services to fixed communication devices 116. In a combined embodiment, network 105 can utilize technology for transporting Internet, voice, and video traffic.

In an enterprise setting, the building 112 can include a gateway 214 that provides voice and/or video connectivity services between communication devices 116, such as VoIP terminals or other forms of communication devices of enterprise personnel. In a residential setting, the building 112 can include a gateway 214 represented by, for example, a residential gateway coupled to central office 106 utilizing conventional telephonic switching for processing calls with third parties.

The network proxy 222 can be used to control operations of a media gateway 209, the central office 106 and the gateway 214. Communications between the network proxy 222, the communication devices 116 and other network elements of the communication system 200 can conform to any number of signaling protocols such as a session initiation protocol (SIP), or a video communications protocol such as H.323 which combines video and voice over a packet-switched network.

The network proxy 222 can comprise a communications interface 224 that utilizes common technology for communicating over an IP interface with the network 105, the media gateway 209, the cellular network 213, and/or the gateway 214. By way of the communications interface 224, the network proxy 222 can direct by common means any of the foregoing network elements to establish packet switched data, voice, and/or video connections between communication devices 116 distributed throughout the communication system 200. The network proxy 222 can further comprise a memory 226 (such as a high capacity storage medium) embodied in this illustration as a database, and a controller 228 that makes use of computing technology such as a desktop computer, or scalable server for controlling operations of the network proxy 222. The network proxy 222 can operate as an IP Multimedia Subsystem (IMS) conforming in part to protocols defined by standards bodies such as 3GPP (Third Generation Partnership Protocol).

Under the control of the network proxy 222, the media gateway 209 can link packet-switched and circuit-switched technologies such as the cellular network 213 (or central office 106) and the network 105, such as an ISP network. The media gateway 209 can conform to a media gateway control protocol (MGCP) also known as H.248 defined by work groups in the Internet Engineering Task Force (WETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 200. The media gateway 209 can therefore support hybrid communication environments for communication devices 116, including VoIP terminals.

The cellular network 213 can support voice and data services over a number of access technologies such as GSM-GPRS, EDGE, CDMA-1X, UMTS, WiMAX, software defined radio (SDR), and other known and future technologies. The cellular network 213 can be coupled to base stations 227 under a frequency-reuse plan for communicating over-the-air with roaming VoIP terminals 116.

Figure 3:
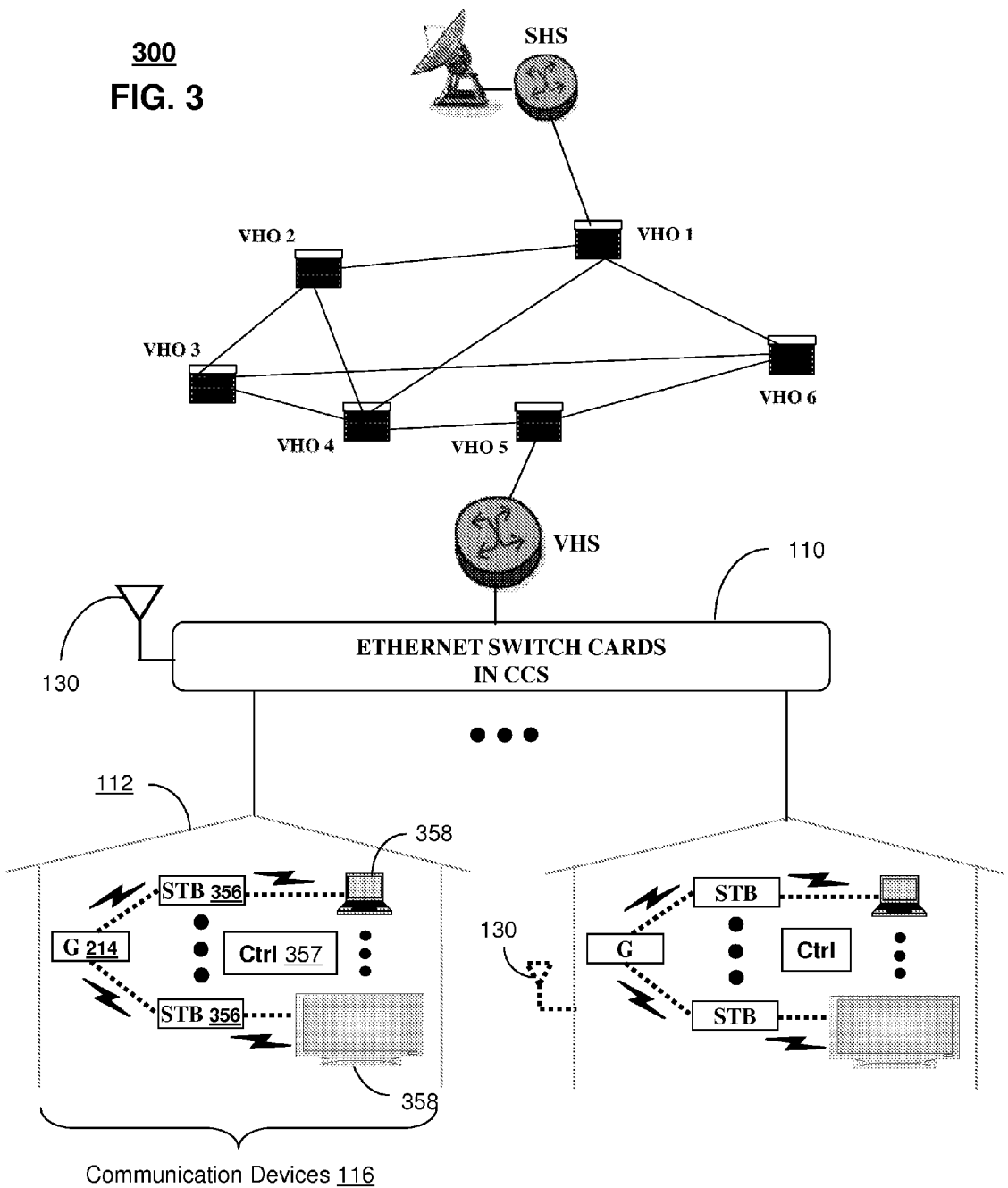

FIG. 3 depicts an exemplary embodiment of a communication system 300 embodying an IPTV service. Communication system 300 can be overlaid or operably coupled with communication system 200 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing a gateway 214 (e.g., a residential gateway or RG) that distributes broadcast signals to receivers such as Set-Top Boxes (STBs) 356 which in turn present broadcast selections to media devices 358 such as computers or television units managed in some instances by a media controller 357 (e.g., an infrared or RF remote control).

Unicast traffic can also be exchanged between the STBs 356 and the subsystems of the IPTV communication system 300 for services such as video-on-demand (VoD). Although not shown, the aforementioned multimedia system can also be combined with analog broadcast distributions systems.

Figure 4:
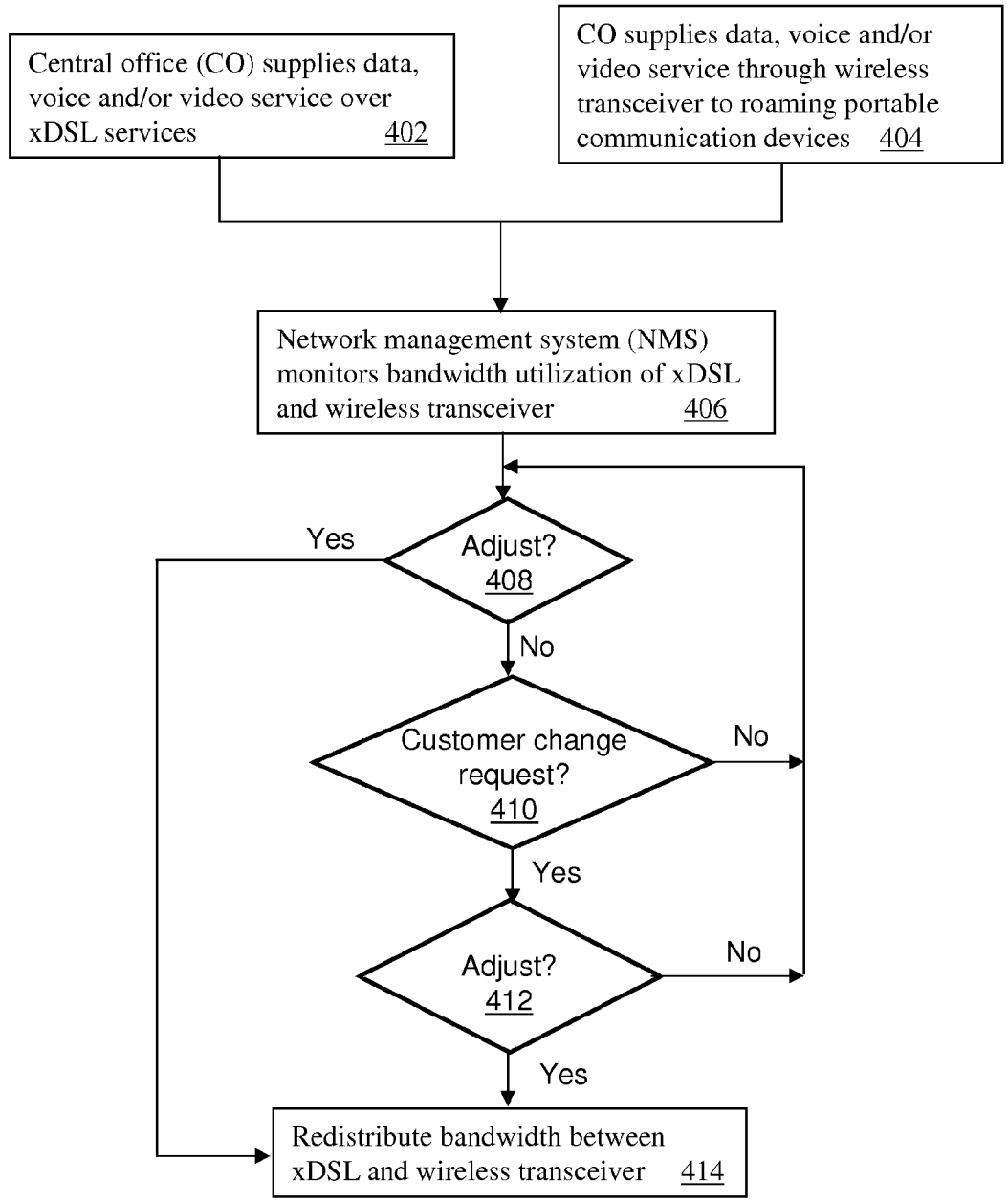
FIG. 4 depicts an exemplary method operating in one or more of the communication systems of FIGS. 1-3.

FIG. 4 depicts an exemplary method 400 operating in portions of communication systems 100, 200 and/or 300. Method 400 can begin with steps 402-404 in which the central office 106 supplies one or more fixed or roaming communication devices 116 desired communication services by way of at least one of the dual-mode communications means of the CCS 110 (i.e., xDSL and WiMAX). The communication services can comprise multimedia services in the form of data (e.g., Internet), voice (PSTN or VoIP), and/or video services (e.g., IPTV, VoIP with video, etc.) as discussed earlier.

In step 406, a network management system (NMS) can be used by the CO 106 to monitor bandwidth utilization of the wireline (xDSL) and wireless (WiMAX) services supplied by the CCS 110. The NMS can represent a common computing system such as a server co-located in the CO 106 or coupled to network 105 by common wired or wireless means. Alternatively, the NMS can be sub-functional component of a network element (e.g., a telecommunications switch) co-located in the CCS 110. In yet another arrangement, the NMS can be an operable component of the network proxy 222. For illustration purposes only, the NMS will be referred to as NMS 222.

The NMS 222 can be programmed to periodically monitor bandwidth utilization by taking measurements at one or more digital subscriber line access multiplexers (DSLAMs) coupled to the Ethernet switch 120, or by taking measurements directly at the Ethernet switch 120 and/or the wireless transceiver 130. The measurements can include packet traffic volume, bit error rate, jitter, packet delays, packet losses, transmission errors detected, circuit-switch usage, and so on. Any technique can be applied to determine the degree of bandwidth utilization at each building 112.

Using common load balancing techniques, the NMS 222 can be programmed in step 408 to determine whether an adjustment is required to support the communication services subscribed to at each of buildings 112 served by the CCS 110. Load balancing techniques can be based on threshold bandwidth utilization averages, or statistical analysis using for example regression techniques to determine whether a redistribution of bandwidth between buildings 112 is required. Load balancing in the present context can be between a plurality of Ethernet switch cards 120 of the CCS 110 and the bandwidth available through the wireless transceiver 130 coupled thereto. The load balancing criteria can also be defined by the service provider of the aforementioned services in any manner that improves quality of service, profitability or some other desirable objective.

With these principles in mind, the NMS 222 can determine that bandwidth utilization in one or more buildings 112 warrants redistribution to balance utilization in the CCS 110. When such a determination is made, the NMS 222 can proceed to step 414 to redistribute bandwidth amongst the resources available to the CCS 110 to achieve objectives set forth by the service provider. To accomplish this, in one arrangement, the NMS 222 can redistribute bandwidth utilization between multiple Ethernet switch cards 120. In another arrangement, the NMS 222 can determine that some of the buildings 112 have a complementary wireless transceiver 130 in which a portion of the aggregated services supplied by the CO 106 (e.g., voice, video, data) can be distributed in part by xDSL and another portion by wireless means between the wireless transceivers 130. For example, xDSL for a building might carry voice and video services, while a wireless transceiver 130 in said building is supplied Internet services by way of the wireless transceiver 130 coupled to the CCS 110.

If on the other hand the NMS 222 determines in step 408 that a load balancing adjustment is not required, the NMS can proceed to steps 410-412 in which the NMS determines if a customer request for additional communication services has been requested, and whether a bandwidth adjustment is required. Additional services can include faster Internet service (e.g., 2 Mbps to 10 Mbps), high definition media programs (e.g., HDTV), more xDSL ports, etc. If more bandwidth is required, the NMS can perform similar load balancing techniques as previously discussed for step 414 to determine how to best distribute the additional bandwidth requested. As noted earlier, load balancing can be accomplished by a redistribution of bandwidth between the Ethernet switch cards 120 and/or use of the wireless transceiver 130 if the customer has a complementary transceiver in building 112. If the customer does not have a wireless transceiver 130 coupled to building 112, the NMS 222 can also be programmed to generate a work order that prompts a field technician to install a transceiver in said building if its addition is determined to be required to manage the aggregated services provided by the CCS 110 to buildings serviced thereby.

From the foregoing descriptions, it would be evident to an artisan with ordinary skill in the art that the aforementioned embodiments can be modified, reduced, or enhanced without departing from the scope and spirit of the claims described below. For example, more than one wireless transceiver 130 can be added to the CCS 110 than is shown. Similarly, a plurality of complementary wireless transceivers 130 can be added to buildings 112. With this configuration, the bandwidth load balancing and bandwidth augmentation techniques can be improved further. Moreover, combinations of disparate wireless transceivers 130 can be used at the CCS 110 and buildings 112 served thereby. For example, the CCS 110 can be coupled to a WiMAX transceiver and a transceiver supporting UMTS. Combinations such as this can be applied to building 112. These are but a few examples of the modifications that can be applied to the present disclosure without departing from the scope of the claims. Accordingly, the reader is directed to the claims for a fuller understanding of the breadth and scope of the present disclosure.

Figure 5:
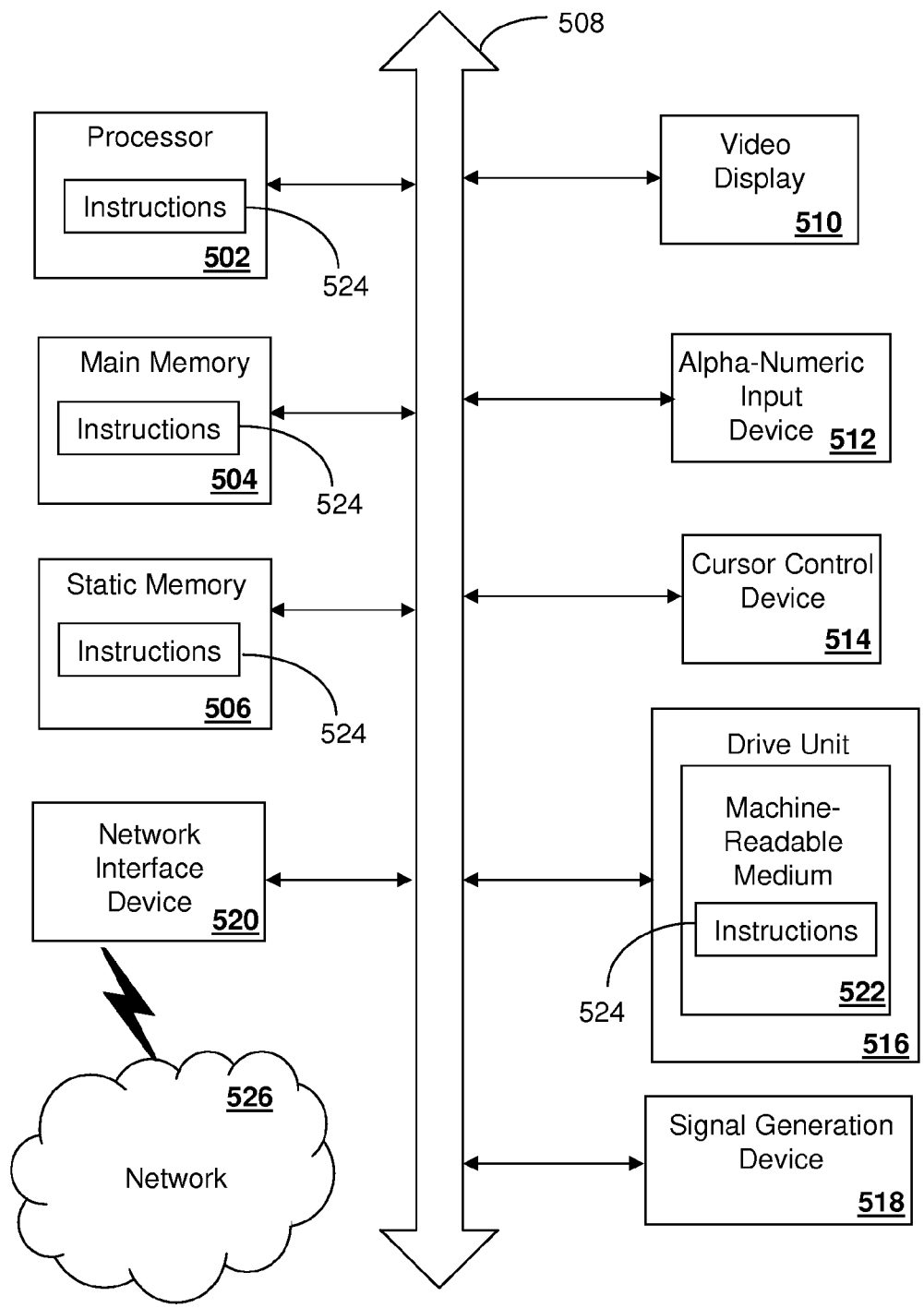
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A cross-connect system comprising:
   an Ethernet switch that couples to a digital subscriber line access multiplexer of a central office and couples to a plurality of buildings by way of a plurality of digital subscriber line ports, the central office being connected to a network supplying communications services, the cross-connect system being separate from the central office and coupled thereto by a communication link, the cross-connect system accordingly not directly connected to the network;
   a wireless transceiver coupled to a port of the Ethernet switch;
   a controller comprising:
      a memory to store instructions; and
      a processor coupled to the memory, wherein responsive to executing the instructions, the processor performs operations comprising:
         providing to the plurality of buildings, via the Ethernet switch by way of the plurality of digital subscriber line ports, a first portion of multimedia services received from the digital subscriber line access multiplexer;
         providing to a building of the plurality of buildings having a corresponding wireless transceiver, via the Ethernet switch by way of the wireless transceiver, a second portion of the multimedia services received from the digital subscriber line access multiplexer; and
         adjusting a bandwidth of each of the first and second portions of the multimedia services according to bandwidth utilization needs of the building of the plurality of buildings; and
   a housing assembly, wherein the Ethernet switch, the wireless transceiver and the controller are co-located at the housing assembly and are remote from the digital subscriber line access multiplexer and remote from each building of the plurality of buildings,
   wherein the Ethernet switch is coupled to each building of the plurality of buildings by way of a hardwire link consisting essentially of twisted pair cables or coaxial cable,
   wherein the first portion of the multimedia services is delivered directly from the plurality of digital subscriber line ports of the Ethernet switch to the plurality of buildings over the hardwire links, the first portion of the multimedia services and the second portion of the multimedia services accordingly being delivered to the plurality of buildings only via ports of the Ethernet switch,
   wherein a network management system of the central office determines whether a building has a wireless transceiver to receive the second portion of the multimedia services and determines, when the building does not have a wireless transceiver, whether addition of a new wireless transceiver is required to manage the multimedia services provided to the building, and
   wherein the network management system of the central office automatically generates a work order to prompt installation of the new wireless transceiver when the addition of the new wireless transceiver is required.

2. The cross-connect system of claim 1, wherein the operations performed by the processor further comprise determining the bandwidth utilization needs according to measurements of parameters of the Ethernet switch by way of the plurality of digital subscriber line ports or the Ethernet switch by way of the wireless transceiver without utilizing measurements of parameters of the digital subscriber line access multiplexer.

3. The cross-connect system of claim 1, wherein the operations performed by the processor further comprise:
   receiving a request for additional communication services for the building; and
   increasing the bandwidth of the second portion of the multimedia services provided via the Ethernet switch by way of the wireless transceiver to the building based on the request.

4. The cross-connect system of claim 1, wherein the wireless transceiver supplies roaming communication services to roaming communication devices, and wherein the central office manages operations of the wireless transceiver for the roaming communication services by way of the Ethernet switch.

5. The cross-connect system of claim 1, further comprising a group of Ethernet switches housed in the housing assembly, wherein the operations performed by the processor further comprise performing load balancing by selecting from among the group of Ethernet switches for providing the first portion of the multimedia services to the plurality of buildings.

6. The cross-connect system of claim 1, wherein the Ethernet switch is coupled to the digital subscriber line access multiplexer by way of an optical cable.

7. The cross-connect system of claim 1, wherein the first and second portions of the multimedia services comprise internet protocol television services and internet data services, and wherein the operations performed by the processor further comprise:
   receiving a request for modifying a subscriber service plan to include additional communication services for the building; and
   based on the request, adjusting the bandwidth of the first portion of the multimedia services provided via the Ethernet switch by way of the plurality of digital subscriber line ports to the building or the bandwidth of the second portion of the multimedia services provided via the Ethernet switch by way of the wireless transceiver to the building.

8. A method, comprising:
   receiving, by a cross-connect system comprising a processor, data from a switching element of a central office, wherein the central office is connected to a network supplying communications services, wherein the cross-connect system is remote from the switching element and is connected to the switching element via a hardwire link, the cross-connect system accordingly not directly connected to the network, wherein the data corresponds with an aggregated service comprising internet and multimedia services to be provided to a plurality of buildings, wherein the data comprises video content or voice content, and wherein the cross-connect system is remote from each building of the plurality of buildings;
supplying, by the cross-connect system, a first portion of the aggregated service to the plurality of buildings over corresponding digital subscriber line ports having a limited capacity, wherein the digital subscriber line ports are supplied by an Ethernet switch of the cross-connect system, and the Ethernet switch delivers the first portion of the aggregated service directly to each building of the plurality of buildings;
determining, by the cross-connect system, bandwidth utilization of a portion of the plurality of buildings based on measuring parameters of the digital subscriber line ports of the Ethernet switch and a wireless access point of the cross-connect system, wherein the Ethernet switch and the wireless access point are co-located at a housing assembly of the cross-connect system remote from each building of the plurality of buildings; and
augmenting, by the cross-connect system, the limited capacity of the digital subscriber line ports by distributing a second portion of the aggregated service by way of the Ethernet switch over the wireless access point of the cross-connect system based on the determined bandwidth utilization,
wherein the second portion of the aggregated service is distributed to a building of the plurality of buildings having a corresponding wireless access point, the first portion of the aggregated service and the second portion of the aggregated service accordingly being delivered to the plurality of buildings only via ports of the Ethernet switch,
wherein a network management system of the central office determines whether a building has a wireless access point to receive the second portion of the aggregated service and determines, when the building does not have a wireless access point, whether addition of a new wireless access point is required to manage the aggregated service provided to the building, and
wherein the network management system of the central office automatically generates a work order to prompt installation of a new wireless access point when the addition of the new wireless access point is required.

9. The method of claim 8, wherein the Ethernet switch delivers the first portion of the aggregated service using twisted pair cables or coaxial cable without using an optical cable.

10. The method of claim 8, wherein the determining of the bandwidth utilization is performed by a processor without utilizing measured parameters of the switching element.

11. The method of claim 8, further comprising performing load balancing by selecting from among a group of Ethernet switches of the cross-connect system for providing the first portion of the aggregate service to the plurality of buildings, wherein the group of Ethernet switches is housed in the housing assembly and includes the Ethernet switch.

12. The method of claim 8, further comprising:
receiving communications at the cross-connect system, the communications being provided over an optical cable connecting the cross-connect system with a central office, wherein the communications are used to manage roaming communications with a roaming communication device, wherein the wireless access point comprises a wireless transceiver or a cellular base station, and wherein the switching element comprises a digital subscriber line access multiplexer.

13. The method of claim 8, further comprising:
receiving a request for additional communication services for a building of the plurality of buildings; and
adjusting an amount of the first portion or the second portion of the aggregate service based on the request.

14. A network management system comprising:
a digital subscriber line access multiplexer that provides data to a cross-connect system for delivery of communication services to a plurality of buildings, wherein the communication services are supplied by a network connected to a central office, the cross-connect system being separate from the central office and accordingly not directly connected to the network, wherein the digital subscriber line access multiplexer and the cross-connect system are remotely located from each other and connected via a hardwire link, wherein the data comprises video content or voice content, and wherein the communication services comprise digital subscriber line services and wireless access services; and
a controller element that manages operations of the cross-connect system, wherein the controller element provides the digital subscriber line services via an Ethernet switch of the cross-connect system by way of digital subscriber line ports of the Ethernet switch and provides the wireless access services via the Ethernet switch by way of a wireless transceiver of the cross-connect system, the digital subscriber line services and the wireless access services accordingly being delivered to the plurality of buildings only via ports of the Ethernet switch, and wherein the controller element determines whether a building has a wireless transceiver to receive the wireless access services, determines whether, when the building does not have a wireless transceiver, addition of a new wireless transceiver is required to manage the communication services provided to the building, and automatically generates a work order to prompt installation of the new wireless transceiver when the addition of the new wireless transceiver is required,
wherein a proportion of the digital subscriber line services to the wireless access services to be delivered is determined based on measurements of parameters of the Ethernet switch or the wireless transceiver without utilizing measurements of parameters of the digital subscriber line access multiplexer, and
wherein the Ethernet switch delivers the digital subscriber line services directly to the plurality of buildings using twisted pair cables or coaxial cable, each building of the plurality of buildings being remote from the digital subscriber access multiplexer and remote from the cross-connect system.

15. The network management system of claim 14, wherein the proportion of the digital subscriber line services to the wireless access services to be delivered is determined according to a request for additional bandwidth by a consumer.

16. The network management system of claim 14, wherein the proportion of the digital subscriber line services to the wireless access services to be delivered is determined by a processor of the cross-connect system that is co-located with the Ethernet switch and the wireless transceiver at a housing assembly of the cross-connect system.

17. The network management system of claim 14, wherein the work order comprises a request to deploy wireless transceivers for installation to manage bandwidth utilization of the communication services supplied by the cross-connect system.

18. A method, comprising:
receiving, by across-connect system comprising a processor, data from a digital subscriber line access multiplexer of a central office for providing a communication service to a premises, the central office being connected to a network supplying the communication service, the cross-connect system being separate front the central office and coupled thereto by a communication link, the cross-connect system accordingly not directly connected to the network, the cross-connect system and the digital subscriber line access multiplexer being remotely located from each other, the data comprising voice content or video content;

providing the communication service to the premises using the cross-connect system, wherein the cross-connect system comprises an Ethernet switch comprising a high speed port and a plurality of digital subscriber line ports and a wireless transceiver in communication with the high speed port; and augmenting, by the cross-connect system, bandwidth of the communication service by combining bandwidth from a digital wireline service via the Ethernet switch by way of the plurality of digital subscriber line ports of the Ethernet switch and bandwidth from a wireless service via the Ethernet switch by way of the wireless transceiver, the communication service accordingly being provided to the premises only via ports of the Ethernet switch, wherein the Ethernet switch provides the digital wireline service directly to the premises using twisted pair cables or coaxial cable, wherein a network management system of the central office determines whether the premises have a complementary wireless transceiver to access the wireless service and determines, when the premises do not have a complementary wireless transceiver, whether addition of a new complementary wireless transceiver is required to manage the communication service provided to the premises, and wherein the network management system automatically generates a work order to prompt installation of a new wireless transceiver in the premises when the addition of the new complementary wireless transceiver is required.

19. The method of claim 18, wherein the data is received at the cross-connect system from the digital subscriber line access multiplexer over an optical cable, wherein the wireless transceiver uses a worldwide interoperability for microwave access mode, and wherein the communication service comprises two of a multimedia programming service, an Internet service, a voice communication service, and a video communication service.

20. The method of claim 18, further comprising:

monitoring bandwidth utilization associated with the premises based on measurements of parameters of the Ethernet switch or the wireless transceiver, the monitoring being performed by the cross-connect system without obtaining measurements of parameters of the digital subscriber line access multiplexer.

\* \* \* \* \*